United States Patent

[11] 3,614,009

[72] Inventor Jerry P. Ramult
715 Encino Drive, Arcadia, Calif. 91006
[21] Appl. No. 618,061
[22] Filed Feb. 23, 1967
[45] Patented Oct. 19, 1971

[54] MAGNETIC TAPE CARTRIDGE
6 Claims, 4 Drawing Figs.

[52] U.S. Cl. 242/55.19 A, 179/100.2 Z, 242/71.8
[51] Int. Cl. B65h 17/48
[50] Field of Search 242/55.19 A, 55.19, 55.18, 55.13, 55.12; 226/168, 176, 177, 196, 198; 179/100.2 Z; 224/71.8, 55.19 A

[56] References Cited

UNITED STATES PATENTS

| | | | |
|---|---|---|---|
| 2,551,198 | 5/1951 | Barrett | 179/100.2 Z |
| 3,243,134 | 3/1966 | Reed et al. | 242/55.19 A |
| 3,265,270 | 8/1966 | Catallo | 226/176 X |
| 3,289,906 | 12/1966 | Schuller | 226/168 |
| 3,289,963 | 12/1966 | Taylor et al. | 242/55.19 A |
| 3,350,028 | 10/1967 | Lear | 242/55.19 A X |

FOREIGN PATENTS

| | | | |
|---|---|---|---|
| 1,359,359 | 3/1964 | France | 242/55.19 A |

*Primary Examiner*—Billy S. Taylor
*Attorney*—Smyth, Roston & Pavitt

ABSTRACT: This invention relates to a driving system for magnetic tape which may be used with a magnetic tape cartridge system and wherein the driving system includes a nonrotatable pinch surface in combination with a rotatable capstan to provide for the movement of the magnetic tape. The invention also relates to the use of a relief ledge in a rotatable hub used in an endless coil-type magnetic tape cartridge to reduce friction and flatten the magnetic tape as the magnetic tape emerges from an inside portion of the endless coil of magnetic tape supported by the rotatable hub.

INVENTOR:
Jerry P. Ramult

By Smyth, Roston & Pavitt
ATTORNEYS

INVENTOR:
Jerry P. Ramult

By Smyth, Roston & Pavitt
ATTORNEYS

MAGNETIC TAPE CARTRIDGE

In recent years the use of magnetic tape recording and reproducing systems for recording and reproducing audio information has increased enormously. Magnetic tape recording and reproducing systems provide several substantial improvements over the use of ordinary phonograph disc recording and reproducing systems. First, the magnetic tape does not wear as rapidly as the phonograph disc. Second, larger amounts of recorded information may be stored in a smaller package when compared with the phonograph disc. Third, the magnetic tape is capable of a much higher fidelity for a greater number of replays than the phonograph disc.

Certain factors have prevented a more widespread use of magnetic tape recording and reproducing systems. Among these factors are, first, the relative difficulty of handling of the magnetic tape when compared with the phonograph disc and, second, the cost of the magnetic tape as compared with the cost of the phonograph disc.

One way in which it has been proposed to alleviate the difficulty of handling the magnetic tape is through the use of magnetic tape cartridges. These cartridges generally have a rotatable hub member which supports an endless coil of magnetic tape. A length of the endless coil of magnetic tape emerges from an inside portion of the coil of magnetic tape and is guided along a predetermined path. After passing along the predetermined path the length of tape is received at the outside portion of the coil of magnetic tape. A magnetic head is positioned along the predetermined path to record or reproduce signals on the magnetic tape.

The tape cartridge systems currently in use generally provide two methods for producing a movement of the magnetic tape along the predetermined path. In the first system the tape cartridge is inserted into a tape cartridge machine for recording and reproducing and the tape cartridge machine contains a capstan external to the tape cartridge which is arranged along the predetermined path. The magnetic cartridge of the first system includes a rotatable pinch roller which is part of the tape cartridge and which also is positioned along the predetermined path. The combination of the capstan provided by the machine and the rotatable pinch roller provided by the tape cartridge produces the movement of the magnetic tape.

In the second system the tape cartridge is inserted into a tape cartridge machine for recording and reproducing and the machine includes a capstan and also includes a rotatable pinch roller, both of which are external to the tape cartridge. The rotatable pinch roller is positioned along the predetermined path to pinch the magnetic tape between the pinch roller and the external capstan. The pinch roller is actually positioned within the tape cartridge by rotating the pinch roller through an opening in the bottom of the tape cartridge. Although the second system reduces the cost of the tape cartridge, since the pinch roller is provided for in the tape cartridge machine and, therefore, each tape cartridge does not have to contain a pinch roller, the mechanism for moving the pinch roller into and out of the tape cartridge increases the mechanical complexities of the tape cartridge machine and, therefore, increases the cost of the tape cartridge machine. The first system which includes an internal pinch roller in the tape cartridge simplifies the tape cartridge machine but the cost of the individual tape cartridges is increased.

The present invention provides for the movement of the magnetic tape along the predetermined path by using a nonrotatable pinch surface within the tape cartridge in combination with the rotatable capstan provided by the tape cartridge machine. The nonrotatable pinch surface of the present invention has a relatively low coefficient of friction when compared to the external capstan so that the magnetic tape slides over the nonrotatable pinch surface in response to the rotation of the external capstan. The use of the nonrotatable pinch surface greatly simplifies the construction of the magnetic tape cartridge of the present invention since the nonrotatable pinch surface may merely be a piece of inexpensive molded plastic.

It is also possible to provide for a flexibility in the mounting of the nonrotatable pinch surface of the present invention so as to lower the tolerances and eliminate problems of alignment for different tape cartridges. Also, present-day magnetic tapes are usually lubricated and the oxide surface of the magnetic tape generally has a higher coefficient of friction than the side of the magnetic tape opposite the oxide surface. The use of lubricated magnetic tapes, therefore, helps the magnetic cartridge of the present invention to operate properly since the lubrication provides for a lower friction between the side opposite the oxide surface which rides on the nonrotatable pinch surface when compared to the oxide surface which contacts the external capstan.

Prior art magnetic tape cartridges have also included the structures within the tape cartridge for flattening the magnetic tape as the tape emerges from the inside portion of the coil of magnetic tape supported on the rotatable hub. These prior art magnetic tape cartridges have also found it necessary to provide for friction means or brake means in the tape cartridge. The magnetic cartridge of the present invention eliminates all these prior art structures for flattening the tape and providing friction and uses a new construction for the rotatable hub.

In the rotatable hub of the present invention a relief ledge is provided which allows the magnetic tape emerging from the inside portion of the coil of magnetic tape to be in a flattened position. The magnetic tape is in a flattened position because the portion of length of magnetic tape emerging from the inside portion of the coil of magnetic tape rides on an edge portion of the rotatable hub and the relief ledge provides for a drastic reduction in the diameter of the rotatable hub so that the magnetic tape tends to slide into the relief ledge and become flattened. Also, since the length of magnetic tape emerging from the inside portion of the coil is supported on an edge portion of the rotatable hub, the friction between the magnetic tape and the hub is relatively low. It has been found with the magnetic tape cartridge of the present invention that the lowering of friction allows for a proper movement of the magnetic tape through the use of a nonrotatable pinch surface instead of the prior art rotatable pinch rollers.

The magnetic tape cartridge of the present invention, therefore, is relatively inexpensive when compared to the prior art magnetic tape cartridges and the magnetic tape cartridge of the present invention is particularly suited for a low-price, high-volume market. For example, the magnetic tape cartridge of the present invention may be compared with 45-r.p.m. phonograph records which contain a limited amount of recorded information but which have a relatively high-volume market. The magnetic tape cartridge of the present invention could be sold for a price comparable to 45-r.p.m. phonograph records and would contain approximately the same amount of recorded information as the 45-r.p.m. phonograph records now on the market.

A clearer understanding of the invention will be had with reference to the following description and drawings wherein.

Figure 1:
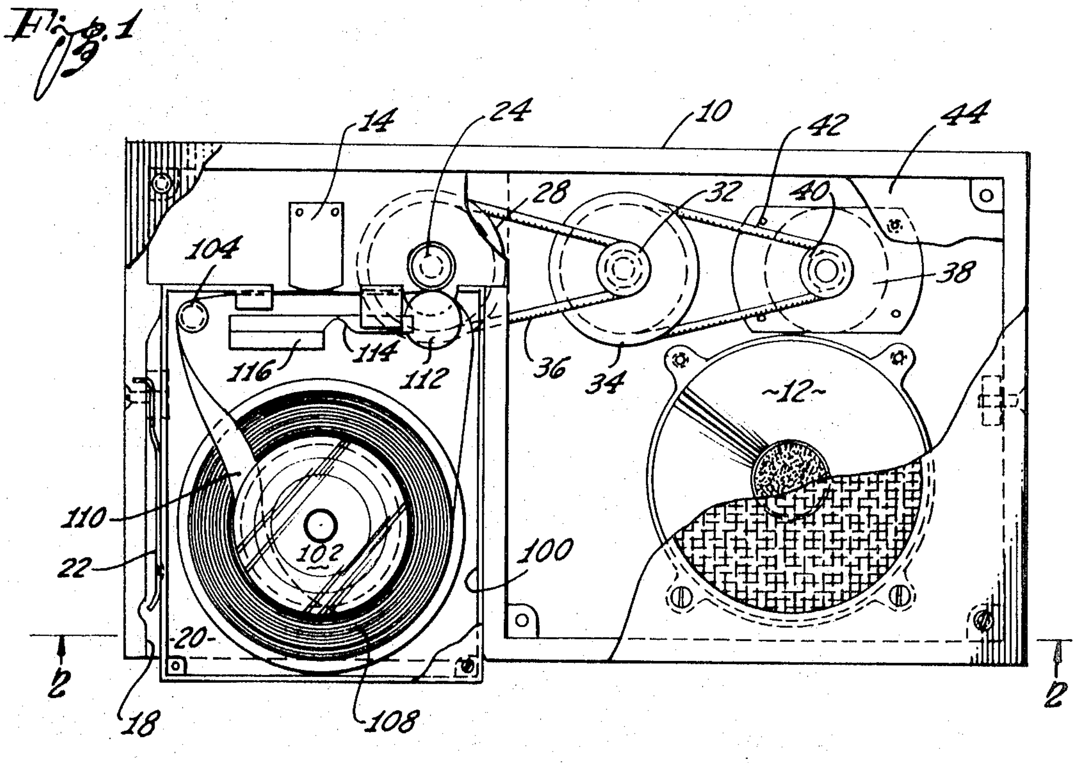
FIG. 1 illustrates a top view of a magnetic tape reproducing apparatus for reproducing information recorded on magnetic tape contained in a magnetic tape cartridge and showing the magnetic tape cartridge so inserted in the apparatus and with the internal construction of the cartridge and apparatus exposed.
Figure 2:
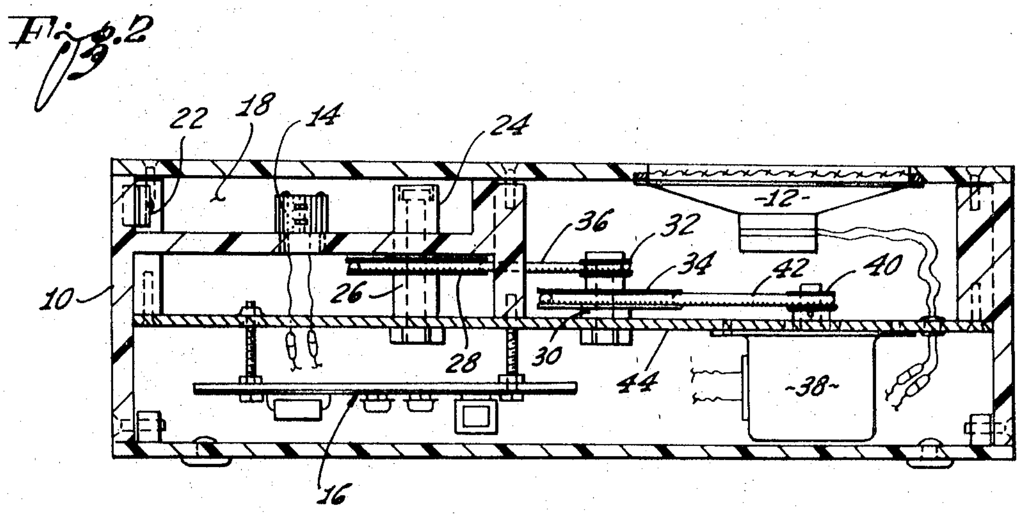
FIG. 2 illustrates a front view of the internal construction of the apparatus of FIG. 1 and showing the magnetic tape cartridge removed from the apparatus.

In FIGS. 1 and 2, a housing 10 supports the various components which are used to provide a magnetic tape cartridge reproducing apparatus. Included within the housing 10 is a loudspeaker 12 for ultimately producing audible sounds from the information recorded on the magnetic tape. The magnetic tape reproducing apparatus of FIGS. 1 and 2 also includes a reproducing head 14 which produces electrical signals from the information magnetically recorded on the magnetic tape. The electrical information from the magnetic head 14 is then supplied to an electrical circuit included on a printed circuit board 16 to amplify the electrical information and provide the proper compensation. Also, the printed circuit board 16 may contain circuitry to provide for control of the amplitude and frequency characteristics of the electrical information so as to control the volume and tone of the audible sounds. The speaker 12 is then driven by the output signals produced by the circuitry contained on the printed circuit board 16.

The housing 10 includes an opening 18 which is best shown in FIG. 2. The opening 18 is designed to receive a magnetic tape cartridge 20. A spring member 22 provides pressure on one side of the magnetic tape cartridge 20 so as to maintain the magnetic tape cartridge 20 in the proper position within the opening 18. The magnetic tape cartridge 20 is slid into the opening 18 to the position shown in FIG. 1 so that the magnetic tape cartridge 20 is aligned with the magnetic reproducing head 14 within the reproducing apparatus of FIGS. 1 and 2.

The housing 10 also includes a capstan 24. The capstan is supported for rotation by a spindle 26 and the spindle 26 also contains a pulley 28. A second spindle 30 supports an intermediary belt driving mechanism including a pair of pulleys 32 and 34. A belt 36 is interconnected between the pulley 32 and the pulley 28. Finally, a motor 38 drives a pulley 40 and a belt 42 is provided between the pulley 40 and the pulley 34. The entire drive mechanism is supported by a member 44 extending across the housing 10.

As the motor 38 rotates to provide rotation of the pulley 40 the rotation of the pulley 40 is translated into a rotation of the pulley 34 by the belt 42. Rotations of pulley hub 34 produce rotations of the pulley 32 since they are both on the same spindle 30. A rotation of the pulley 32 produces a corresponding rotation of the pulley 28 through the belt 36. Finally, the capstan 24 is rotated due to the rotation of the pulley 28 since the pulley 28 and the capstan 24 are both supported on the spindle 26.

It can, therefore, be seen that a speed reduction system is provided through the use of the various pulleys and belts so that a relatively high-speed motor 38 may be used to produce a relatively slow speed of the capstan 24. The capstan 24 may include an outer layer of relatively high friction material such as rubber, or the capstan 24 may merely have a relatively rough surface to increase the friction on the surface of the capstan.

Figure 3:
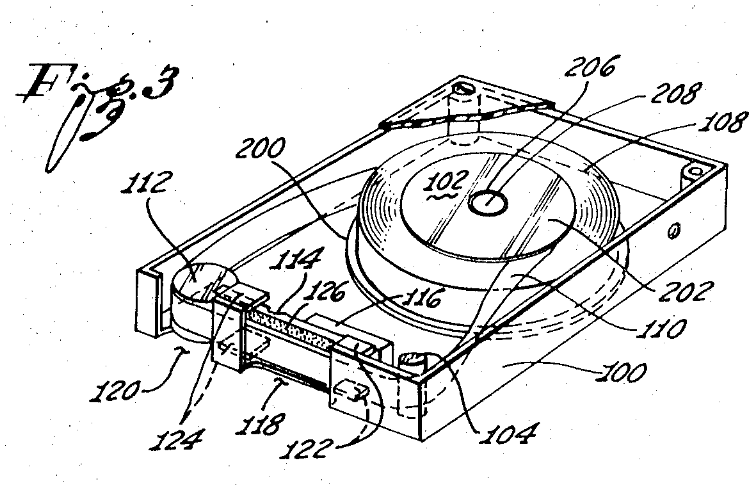
FIG. 3 is a perspective view of the magnetic tape cartridge of FIG. 1 constructed in accordance with the teachings of the present invention.

The magnetic tape cartridge 20 of the present invention may be seen in FIGS. 1 and 3 and the cartridge 20 includes an outer housing 100. In FIGS. 1 and 3 at the top plate of the housing is partially broken away so as to expose the inner construction of the magnetic tape cartridge 20. The magnetic tape cartridge 20 includes a rotatable hub member 102 which will be explained later in greater detail with reference to FIG. 4. The magnetic tape cartridge also includes a guide member 104. The magnet rotatable hub member 102 supports a coil of magnetic tape 108. The guide member receives and guides a length of magnetic tape 110 emerging from the coil 108 of magnetic tape supported on the rotatable hub member 102 along a predetermined path.

The length of magnetic tape 110 is guided by the guide member 104 and extends across the front face of the magnetic tape cartridge 20. The magnetic tape then extends over a pinch surface 112 is such as a piece of plastic. The pinch surface 112 is nonrotatable and has a relatively low coefficient of friction when compared with the coefficient of friction of the surface of the external pinch roller 24. The nonrotatable pinch surface is flexibly mounted at the end of a flexible member 114 such as a piece of flexible plastic. The flexible member 114 is supported from the bottom plate of the housing 100 by a support member 116 which is attached to the bottom surface of the housing 100. The magnetic tape is guided by the nonrotatable pinch surface 112 to be received by the outside portion of the coil of magnetic tape 108. The magnetic tape, therefore, forms an endless coil of magnetic tape. Movement of the magnetic tape is effected by the rotation of the capstan 24. The magnetic tape is pinched between the rotating capstan 24 and the nonrotating pinch surface 112 and since the coefficient of friction of the nonrotating pinch surface 112 is relatively low, the magnetic tape slides over the nonrotating pinch surface 112 in response to the rotations of the capstan 24.

As the tape moves across the front face of the housing 100, it passes by two openings 118 and 120. The opening 118 allows for the magnetic head 14 shown in FIGS. 1 and 2 to contact the tape and the opening 120 allows for the external capstan 24 shown in FIGS. 1 and 2 to pinch the magnetic tape against the nonrotating pinch surface 112. Extension 122 and 124 provide for a guiding of the tape as it moves across the front surface of the housing 100. Finally, a pad of resilient material 126 may be glued to the member 116 so as to be positioned behind the tape and adjacent to the opening 118. The resilient pad 126 allows for the magnetic tape to be resiliently pressed against the pad 126 by the magnetic head 14 as the tape cartridge is inserted into the reproducing apparatus shown in FIG. 1. The resilient pad 126, therefore, provides for a good contact between the reproducing head 14 and the magnetic tape.

Figure 4:
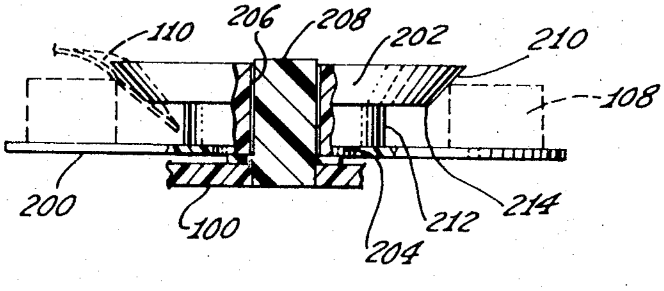
FIG. 4 is a detailed view of the rotatable hub member used in the magnetic tape cartridge shown in FIG. 3.

FIG. 4 shows the rotatable hub 102 used to support the coil of magnetic tape 108. The rotatable hub 102 includes a flat bottom member 200 and an upper supporting structure 202. The upper supporting structure 202 has a circular extension 204 which fits within a corresponding opening in the plate 200. The upper member 202 and the bottom plate member 200, therefore, provide for a unitary rotatable hub. The upper member 202 also includes a circular opening 206. As shown in FIG. 3, a spindle 208 is supported by the bottom plate of the housing 100 and the circular opening 206 fits over the spindle 208 so that the rotatable hub 102 is rotatable about the spindle 208.

The upper supporting structure 202 includes an outside tapered surface 210 and a relief ledge 212. The boundary between the tapered surface 210 and the relief ledge 212 is a circumferential edge portion 214. As the length of tape 110 shown in FIG. 1 emerges from the inside portion of the coil of magnetic tape 108, the length of tape is supported on the edge portion 214 at an angle flatter than the angle of the tapered portion 210. The flatness is produced because the length of magnetic tape which is to emerge from the coil 108 escapes into the relief ledge.

In addition, since the length of magnetic tape 110 emerging from the coil is supported on the edge portion 214, the magnetic tape undergoes less friction as it emerges because it contacts a small portion of the rotatable hub. Since the magnetic tape undergoes less friction as it emerges from the coil, the driving mechanism including the capstan 24 and the nonrotatable pinch surface 112 does not have to overcome a high back tension. Since the back tension is low, the nonrotating pinch surface 112 is suitable to use in combination with the rotating external capstan so as to provide for the movement of the magnetic tape.

The total structure of the magnetic tape cartridge of the present invention is, therefore, relatively simple and inexpensive when compared with the prior art magnetic tape cartridges. The tape cartridge of the present invention may, therefore, be used to provide for the recording of audio information of the type generally recorded on 45-r.p.m. phonograph discs. This type of audio information is usually designated for a high-volume low-price market. The magnetic tape cartridge of the present invention, therefore, may be related to the more expensive magnetic tape cartridges now on the market in the same manner as the 45-r.p.m. phonograph discs are related to the 33-r.p.m. phonograph disc.

It is to be appreciated that the invention has been disclosed with reference to a particular embodiment but that various adaptations and modifications may be made. For example, the magnetic tape cartridge of the present invention may include additional magnetic tape so as to provide for an extended playing time. The invention is, therefore, only to be limited by the appended claims.

What is claimed is:

1. In an endless tape cartridge including an endless loop of magnetic tape and having means for supporting and guiding the magnetic tape for movement from a first position to a second position along a particular path and wherein the movement of the magnetic tape is provided by an external rotating capstan positioned along the particular path, a nonrotatable pinch surface having a convex configuration relative to the rotating capstan and located within the tape cartridge and along the particular path and at a position adjacent to the rotating capstan to pinch the magnetic tape between the rotating capstan and nonrotatable pinch surface and provide movement of the magnetic tape and with the magnetic tape tangentially contacting the pinch surface to minimize the contact surface between the magnetic tape and the pinch surface, wherein the endless loop of magnetic tape includes a coil of magnetic tape and additionally including a rotatable hub including a flange member for supporting the endless coil of magnetic tape and with the magnetic tape emerging from the inner portion of the coil and with the magnetic tape returning to the outer portion of the coil and wherein the hub has a tapered configuration with a relief ledge intermediate the tapered portion and the flange member to reduce friction between the magnetic tape and the hub and to flatten the tape as the tape emerges from the inner portion of the hub and with the distance between the relief ledge and the flange member less than the width of the magnetic tape.

2. In a magnetic tape cartridge including an endless coil of magnetic tape and having means for guiding a length of the endless coil of magnetic tape along a predetermined path and with an external rotating capstan positioned along the predetermined path for engaging the magnetic tape to provide movement of the magnetic tape, a rotatable hub including a flange member for supporting the coil of magnetic tape and with the length of magnetic tape emerging at the inside portion of the coil and returning to the outside portion of the coil and with the rotatable hub including a relief ledge extending circumferentially around the hub and with the boundary between the relief ledge and the remaining portion of the hub forming a circumferential edge portion to support the length of magnetic tape as it emerges from the inside portion of the coil of magnetic tape and with the circumferential edge portion located between the remaining portion of the hub and the flange member and with the distance between the flange member and the circumferential edge portion less than the width of the magnetic tape and with the remaining portion of the hub having a tapered configuration.

3. The magnetic tape cartridge of claim 2 has wherein the length of magnetic tape is flattened as it emerges from the inside portion of the magnetic coil.

4. The magnetic tape cartridge of claim 2 wherein the circumferential edge portion of the rotatable hub forms a low friction surface as the length of magnetic tape emerges from the inside portion of the coil of magnetic tape.

5. The magnetic tape cartridge of claim 2 additionally including a nonrotating pinch surface along the predetermined path and adjacent the external capstan.

6. The magnetic tape cartridge of claim 5 wherein the nonrotating pinch surface has a lower coefficient of friction than the surface of the external capstan.